United States Patent Office 3,301,799
Patented Jan. 31, 1967

3,301,799
RUBBER LATEX, GRAPHITE AND CEMENT
Henry M. Rothberg, Woodbridge, and Frederick J. Foster, Cheshire, Conn., assignors to United States Rubber Company, New York, N.Y., a corporation of New Jersey
No Drawing. Filed Oct. 11, 1963, Ser. No. 315,680
2 Claims. (Cl. 260—17)

This invention relates to electrically conductive hydraulic cement compositions and a method of making the same.

Electrically conductive hydraulic cement compositions find important uses in the construction of floors, walls or the like of hospital operating rooms where it is essential to prevent accumulations of static electricity which could lead to sparks that might ignite anesthetic vapors, causing an explosion in the lungs of the patient being operated upon and/or in the atmosphere of the operating room. Similarly, in certain hazardous industrial environments it is important to prevent occurrence of electrical sparks which could ignite explosives, gases, vapors or dusts. The likelihood of such sparks can be minimized by using electrically conductive materials in the construction of the floors.

Previously known electrically conductive hydraulic cement compositions used for the purpose described have been based on a specific kind of carbon black, known as acetylene black, in a form which is capable of conducting electricity. Unfortunately, the use of acetylene carbon black to render the cement electrically conductive has certain disadvantages, both from the standpoint of difficulties associated with incorporating the acetylene black, and from the standpoint of the properties of the final cement composition. Acetylene black is a loose, fluffy substance that does not readily mix with water and it is necessary to wet it first with isopropyl alcohol or similar material, after which it must be mixed very carefully with water. The mixing with cement is highly critical; overmixing causes a breakdown of structure and destroys the electrical conductivity, while undermixing leads to a material which does not meet specifications for electrical conductivity because of incomplete dispersion of the carbon black. In practice, variable results have therefore been experienced even when careful efforts to maintain exact control on the mixing have been made. Sometimes extremely expensive installations have had to be ripped out and done over again. Even under the best conditions, the use of acetylene black drastically reduces the compressive strength of the cement mix. This is because the presence of the carbon black increases tremendously the amount of water required to make a plastic, readily workable mix. Consequently, there results high shrinkage and porosity in conductive mortar, concrete, and the like based on carbon black. This leads to undesirably frequent breaking or cracking, loosening of tiles or the like, and similar structural defects requiring expensive repairs and replacements in conductive installations. Furthermore, such conductive cements have undesirably high water absorption, easy soilability and a tendency to collect filth and develop odors, with corresponding difficulty in cleaning. There is an undesirable tendency for electrical resistance to increase continually with age. The art of electrically conductive cement compositions made in accordance with prior practice has therefore been considerably retarded for some time, in spite of the importance of this field from the standpoint of health and safety.

Accordingly, it is a principal object of the present invention to mitigate the foregoing disadvantages in an economical and effective manner.

The invention is based on the discovery that disadvantages of prior practice in making electrically conductive hydraulic cement compositions can be overcome by employing graphite as the electrically conductive material, as well as on the discovery that multiple unexpected advantages result from such use of graphite in accordance with the invention.

In one aspect, the invention is concerned with a dispersion of finely divided graphite in an aqueous medium, typically containing a wetting agent such as a non-ionic wetting agent. Such a dispersion is capable of being incorporated easily in various conventional hydraulic cement compositions for the purpose of rendering the compositions electrically conductive, and produces a cement composition having excellent final properties, as will be described in more detail below. The cement employed may be any suitable conventional hydraulic cement, such as the various Portland cements, aluminous cements (such as "Lumnite"), and the like.

In another aspect, the invention is directed to a rubber latex composition containing dispersed graphite, which latex composition is suitable for easy incorporation in hydraulic cement compositions to produce improved conductive cement formulations characterized by remarkably improved properties, in a manner to be described herein. For this purpose there may be used any rubber latex, whether a natural rubber latex or a synthetic or artificial latex such as a latex of a butadiene polymer, polychloroprene, butyl rubber, and the like, or mixtures thereof, that is, mixtures of more than one such latex. Preferred are the butadiene copolymers containing for example up to 70% of at least one copolymerizable monomer such as styrene, acrylonitrile, ethyl acrylate, methyl methacrylate, vinyl acetate, or the like.

In still another aspect the invention is concerned with the use of a colloidal dispersion of graphite in water, and the combination of such dispersion with a water-soluble or water-dispersible film-forming polymer such as an alkyl cellulose, polyvinyl alcohol, polyvinyl acetate, or the like. Combined with hydraulic cement, such formulations yield conductive compositions of unusual utility.

With regard to the relative proportions of graphite and hydraulic cement, it may be stated that it is frequently preferred to have present in the cementitious composition about 25 parts by weight of graphite (dry basis) per 100 parts of the hydraulic cement. In some cases a smaller quantity of graphite is sufficient but in any event at least 10–20 parts per 100 parts of the hydraulic cement is employed. Larger quantities of graphite may be employed, say up to 35–40 parts per 100 of cement. Although an important feature of the invention resides in the use of colloidal graphite, particularly in the form of particles of 10 micron size or less, especially as a dispersion in rubber latex, it may be pointed out that some flake graphite may be included in the cementitious composition (for example, as part of a dry mix of cement plus other desired ingredients to which the colloidal dispersion of graphite, preferably in rubber latex, is added), particularly when the total amount of graphite approaches the above-mentioned larger quantities of 35–40 parts per 100 of cement.

It is desired to emphasize that important advantages of the invention are associated with the use of rubber latex. The latex or mixture of latices will generally have a concentration of about 20% to 60% rubber solids. The water from the latex and any other water that is added will be in amount to give the desired ratio of water to hydraulic cement to satisfy the needs of the cement as in common practice. The amount of rubber solids in the latex and hydraulic cement composition will usually be from 5 to 25 parts by weight rubber solids per 100 parts of the hydraulic cement. For some purposes no aggregate will be included; for other purposes up to for example 500 parts of aggregate (e.g. sand and/or gravel), per 100 parts of the hydraulic cement may be included.

One feature of the composition involves the inclusion of a non-ionic wetting agent in the colloidal graphite dispersion in latex so that the rubber is not prematurely coagulated on mixing the latex with the hydraulic cement. Typical suitable wetting agents are disclosed in U.S. Patent 3,042,643 isued to F. J. Foster on July 3, 1962, particularly at column 1, line 62 to column 2, line 15. Usually the latex contains 3 to 20 parts of such stabilizer per 100 parts by weight of rubber solids.

The aqueous dispersion of colloidal graphite containing no latex frequently comprises from 30 to 90 (preferably about 60) parts by weight (dry basis) of graphite, and from about 5 to 25 (preferably about 13) parts of non-ionic wetting agent, along with about 100 to 400 parts (preferably about 250 parts) of water.

The colloidal graphite-latex composition frequently embodies the following proportions:

|  | Range | Preferred |
| --- | --- | --- |
| Colloidal graphite (dry basis) | 30–90 | 60 |
| Wetting agent | 5–25 | 13 |
| Water | 100–400 | 250 |
| Latex (wet weight) | 50–200 | 100 |

The following examples will serve to illustrate the practice of the invention in more detail.

*Example 1.—Colloidal graphite aqueous dispersion*

| Material | Parts by Weight | |
| --- | --- | --- |
|  | Dry Basis | Wet Basis |
| Water |  | 40 |
| Colloidal graphite | 60 | 200 |
| Non-ionic wetting agent | 13 | 52 |
| Dispersant | 1 | 1 |

The colloidal graphite used in this example is a commercial aqueous preperation containing 30% graphite ("Prodag," Acheson Colloids Co.). The particle size is about 30 microns. The non-ionic wetting agent used may be isooctyl phenyl polyethoxy ethanol ("Triton X-100"), for example. The dispersant may be sodium or calcium salt of ligno sulfonic acid ("Marasperse W"), or Bentonite, for example. The mixture is ball milled for 24 hours, to reduce the particle size of the colloidal graphite to the order of about 4 microns. This product is particularly advantageous for mixing with latex and combining with cement because the non-ionic wetting agent stabilizes against the effect of calcium and other ions in the cement. It also confers a high affinity for water, thereby extending the working time for the mix. The dispersant aids in the grinding by keeping the graphite particles from coming back together again.

*Example 2.—Latex-colloidal graphite*

| Material | Parts by Weight | |
| --- | --- | --- |
|  | Dry Basis | Wet Basis |
| Latex | 100.00 | 202.00 |
| Colloidal dispersion prepared in Example 1 | 74.00 | 293.00 |
| Totals | 174.00 | 495.00 |

(Total solids about 35%).

The latex in this example may be for example a butadiene-styrene (about 58% styrene) copolymer latex containing 51% solids. The ingredients are thoroughly stirred for 1 hour. A film of the mixture is laid down, allowed to dry overnight, then dried in an oven for one hour at 65° C. The electrical resistance of a film 10" x 8" measured across the 10" length, is no greater than 20,000 ohms.

*Example 3.—Conductive underbed*

A dry mix is made of the following materials:

1 bag (1 cu. ft.; 94 pounds) of Portland cement
4 cu. ft. of clean fine sand

To this dry mix is added 4 to 4.5 gallons of the latex-colloidal graphite preparation of Example 2, to form a plastic, workable mix. This is applied as an underbed for a conductive finish floor or conductive ceramic tile. A typical test installation has an electrical resistance of 90,000 to 120,000 ohms after 1 month. After further aging the resistance tends to increase only slightly due to loss of moisture. A similar mix, but slightly stiffer, is suitable as an underbed for terrazzo surface.

Less preferably, an underbed is made in the same manner except that 4 to 4.5 gallons of the colloidal graphite preparation of Example 1, containing no rubber latex, is used. Such underbed is conductive, but is not resilient.

*Example 4.—Non-decorative conductive surfacing*

Dry mix:
  1 bag Portland cement
  250 pounds clean, fine mortar sand

Add 6½ to 7 gallons of the latex-colloidal graphite of Example 2 and mix to a plastic, workable state. If desired 6 pounds of flake graphite (No. C-38, National Carbon Co.) may be included in the dry mix. Spread by conventional trowling technique to a thickness of ¼ to ⅜, for example, and protect from drying while setting, in the conventional manner. The resistance after 1 month is 65,000 to 90,000 ohms, increasing gradually to 95–120,000 ohms over a period of months, after which it remains nearly constant.

*Example 5.—Terrazzo finish flooring*

Dry mix:
  1 bag Portland cement
  200 pounds clean graded marble chips

Add 4½–5 gallons of the latex-colloidal graphite preparation of Example 2, or the colloidal graphite preparation of Example 1 containing no latex, to make a plastic, workable mix which is installed and finished in the conventional manner. The mix made with the latex preparation yields a floor that is more resistant to staining, shows less water absorption, and is more resistant to chemical attack such as by dilute acids, than a conventional conductive terrazzo made with acetylene carbon black.

*Example 6.—Conductive thin bed mortar*
*(thin set adhesive)*

For the setting of conductive ceramic tiles by the thin set adhesive method; make the following dry mix:

1 bag Portland cement
200 pounds fine aggregate (minus 60 mesh)
2 pounds methyl cellulose or the like (e.g. 4000 to 15,000 centipoises)

Add 1 gallon of the latex-colloidal graphite preparation of Example 2 to 15 pounds of the foregoing dry mix. Use as thin set adhesive for setting tile in the conventional manner. The resulting mortar has superior adhesion and is remarkable for its impact and shock resistance as demonstrated by allowing a falling steel ball to strike the tile assembly. Further, the compressive shear exceeds the requirements for shear bond strength. The following are typical test results.

IMPACT RESISTANCE (NUMBER OF CYCLES AT 0.24 FOOT-POUNDS)

| Air Cure (Days) | Conventional Thin Set Portland Cement Mortar | Latex-Colloidal Graphite Setting Mortar |
|---|---|---|
| 7 | 3 | 35 |
| 14 | 4 | 123 |
| 28 | 3 | [1] 180 |
| | Compressive Shear (p.s.i.) | |
| 14 | 34 | 114 |

[1] Tiles pulverized and shattered before any bond failure.

It is desired to emphasize that acetylene carbon black is not suitable for incorporation as a colloidal dispersion in latex in a manner that provides the advantages and surprising new results attained by using a dispersion of colloidal graphite in accordance with the invention.

Having thus described our invention, what we claim and desire to protect by Letters Patent is:

1. An electrically conductive hydraulic cement composition for constructing electrically conductive walls or floors comprising, in admixture, by weight:
   (a) 100 parts of hydraulic cement;
   (b) rubber latex selected from the group consisting of natural rubber latex, butadiene polymer latex, polychloroprene latex and butyl rubber latex, in amount sufficient to provide from 5 to 25 parts of solids of said rubber;
   (c) 10 to 40 parts of colloidally dispersed graphite having a particle size of not more than 10 microns;
   (d) 3 to 20 parts of a non-ionic wetting agent per 100 parts of said solids of rubber latex; and
   (e) up to 500 parts of aggregate.

2. A composition as in claim 1, further containing a film-forming polymer selected from the group consisting of alkyl cellulose, polyvinyl alcohol, and polyvinyl acetate.

References Cited by the Examiner

UNITED STATES PATENTS

| 1,940,528 | 12/1933 | Bond | 260—29.7 |
| 2,676,930 | 4/1954 | McKay et al. | 260—29.7 |
| 2,751,369 | 6/1956 | TeGrotenhuis | 260—29.7 |

OTHER REFERENCES

Marchionna, Butalostic Polymers, Reinhold Publishing Corp., New York, 1946.

MURRAY TILLMAN, *Primary Examiner.*

J. ZIEGLER, *Assistant Examiner.*